United States Patent [19]

Hendry

[11] Patent Number: 5,110,533
[45] Date of Patent: May 5, 1992

[54] METHOD FOR THE USE OF GAS ASSISTANCE IN THE MOLDING OF PLASTIC ARTICLES TO ENHANCE SURFACE QUALITY

[75] Inventor: James W. Hendry, Brooksville, Fla.

[73] Assignee: Milad Limited Partnership, Naples, Fla.

[21] Appl. No.: 610,386

[22] Filed: Nov. 7, 1990

[51] Int. Cl.$^5$ .................. B29C 45.00; B29C 45.34; B29D 22/00
[52] U.S. Cl. .................. 264/572; 264/328.8; 264/328.12; 264/328.13; 425/812
[58] Field of Search .................. 264/85, 328.8, 328.12, 264/328.13, 572; 425/812

[56] References Cited

U.S. PATENT DOCUMENTS

| | | | |
|---|---|---|---|
| 4,101,617 | 7/1978 | Friederich | 264/572 |
| 4,474,717 | 10/1984 | Hendry | 264/572 X |
| 4,935,191 | 6/1990 | Baxi | 264/572 |
| 4,943,407 | 7/1990 | Hendry | 264/572 |

FOREIGN PATENT DOCUMENTS 2158002A 11/1985 United Kingdom.

OTHER PUBLICATIONS

Eckardt, H., "The Airmould Process-A New Gas-Assisted Injection Moulding Process"(Apr. 1990).
Rusch, K. C., "Gas-Assisted Injection Molding-The New Thermoplastic Molding Technology for Exterior Body Panels"(Mar. 1989).

Primary Examiner—Leo B. Tentoni
Attorney, Agent, or Firm—Brooks & Kushman

[57] ABSTRACT

A method of gas-assisted injection molding in which: (1) a first amount of plastic is injected into an article-defining cavity of a mold so that it flows therein; (2) a second amount of plastic continues to be injected into the cavity simultaneous with the injection of a charge of pressurized gas wherein the pressurized gas prevents the flow of plastic in the cavity from stopping; and (3) the charge of pressurized gas continues to be injected after the second amount of plastic is injected to distribute the total amount of molten plastic resin in the cavity. The ratio for the first amount of plastic to the total amount of plastic required for the preparation of the article is in the range of 0.2 to 0.7. Also, the pressurized gas has a pressure between approximately 1000 psi and 5000 psi. These steps prevent imperfections on the exterior surface of the plastic article. The gas charge is maintained under pressure within the article until the article has set up in the article-defining cavity. Finally, the gas pressure is relieved in the article and the finished article is removed from the mold. The method is particularly useful in molding articles having a relative large cross-section.

6 Claims, 5 Drawing Sheets

METHOD FOR THE USE OF GAS ASSISTANCE IN THE MOLDING OF PLASTIC ARTICLES TO ENHANCE SURFACE QUALITY

CROSS REFERENCE TO RELATED APPLICATION

This application relates to co-pending application entitled "Method and System for the Injection Molding of Plastic Articles Utilizing a Fluid Compression Unit", U.S. Ser. No. 552,909 filed July 16, 1990 and assigned to the assignee of the present application.

TECHNICAL FIELD

This invention relates to a method of plastic injection molding and, more particularly, to a method in which pressurized gas is used to assist in the molding process.

BACKGROUND ART

The use of pressurized gas to assist in a conventional plastic injection molding process is believed to have been first made commercially practicable by the invention of Friederich disclosed in U.S. Pat. No. 4,101,617 issued July 18, 1978. The Friederich patent addressed the problem of molding hollow shaped bodies in a single injection molding operation, and taught a practicable method of introducing compressed gas along with, or just after, the injection of molten plastic resin into the article-defining cavity. Moreover, the Friederich patent solved the concern of de-pressurizing or relieving the molded article by nozzle separation. The early work of Friederich was directed to the molding of such utilitarian articles as clear plastic architectural bricks and the like. More recently, the patented Friederich process has been adapted to the molding of hollow plastic articles of various shapes and dimensions.

In its early years, the use of pressurized gas in assistance to a conventional plastic injection mold process was not recognized for all of the functional attributes which it is known to enjoy today. More specifically, during those early years, the industry gave greater focus to the use of structural foam as a specialty process for molding relatively thick-sectioned articles which would be light in weight and have acceptable surface finish, i.e., avoid sink marks associated with the conventional plastic injection molding. The range of potential applications of structural foam molding of thermoplastic material was limited, however, due to certain inherent features of such process. Among such features included, the relatively long cycle times required to cool the plastic in the mold (the foam cells serve to insulate heat transfer), and the problem of surface finish (splay, blister and swirl) associated with the foamed, molten plastic resin contacting the cool surface walls of the article-defining cavity.

In recent years, attention has returned to the use of gas assistance with conventional plastic injection molding to attain the product quality and productivity which had been hoped for With structural foam molding. The features of surface quality, lower clamp tonnage, rapid cycle times, weight reduction, material saving and minimization of part distortion or warpage can all be obtained with proper utilization of gas assistance with a conventional plastic injection molding process. The paper titled "GAS-ASSISTED INJECTION MOLDING—THE NEW THERMOPLASTIC MOLDING TECHNOLOGY FOR EXTERIOR BODY PANELS" by Dr. Ken C. Rusch, presented at the 1989 meeting of the Society of Automotive Engineers on Mar. 2, 1989, discusses in greater detail the relevant history of the use of gasassistance in connection with plastic injection molding. Another paper titled "THE AIR MOULD PROCESS—A GAS-ASSISTED INJECTION MOLDING PROCESS" by Mr. Helmut Eckardt, presented at the 1990 Structural Plastics Conference on Apr. 1-3, 1990 provides an updated history.

The impetus for the present invention was the inventor's assignment to realize the successful plastic injection molding of automobile handles which is a relatively thick molding (i.e. has a relatively thick cross section). The making of such a handle required the removal of substantial volume of plastic from the desired part and wherein the injection pressures are relatively low.

There were several practical problems facing the inventor in realizing the handle design in a hollow plastic molded piece. For example, the exterior surface of the door handle had to be "Class A" quality. Any surface degradation due to hesitation marks, blemishes or other imperfections, were unacceptable for commercial standards. Such hesitation marks typically are formed when substantially all or all of the plastic required for the part is injected into the article-defining mold cavity and only then is a gas charge injected into the mold to form the hollow plastic part. The hesitation marks are formed where the flow of plastic stops and then starts again within the article-defining cavity.

One approach to solve this problem is discussed in the U.S. Pat. No. 4,935,191 to Baxi wherein gas is introduced into the molten stream of plastic material immediately after the molten material has passed the position at which the gas is introduced. Such simultaneous injection is also discussed in UK Patent to Hendry et al GB 2158002A.

The primary problem with this approach is that it is difficult, if not impossible, to control the pressurized gas so that it does not blow clear out of the plastic rather than producing the desired gas bubble within the plastic. One reason for this is that the injection pressure of the molten plastic fluctuates during injection. Also, when a gate is employed in the mold, the pressure of the plastic is substantially higher in front of the gate than in the cavity on the opposite side of the gate (i.e. in the article-defining cavity).

DISCLOSURE OF THE INVENTION

An object of the present invention is to enhance the surface quality of a hollow plastic article by simultaneously injecting a charge of pressurized gas into a mold together with an injection of a second amount of plastic but only after a substantial first amount of plastic has been injected into an article-defining cavity of the mold. In this application, the charge of pressurized gas first prevents the flow of the first amount from stopping and then distributes the total amount of molten plastic resin in the articledefining cavity after the completion of the step of injecting the second amount of plastic. The method prevents imperfections on an exterior surface of the plastic article.

In carrying out the above object and other objects of the present invention, a method for the use of gas-assistance in the molding of hollow plastic articles for improving the surface quality of the plastic article in an injection molding system is provided. The injection molding system includes a mold having an article-defining cavity. The method includes the steps of injecting a first amount of molten plastic resin less than the total amount of molten plastic resin sufficient for the preparation of the plastic article into the cavity so that the first amount of molten plastic resin flows in the cavity. The method also includes the step of injecting a charge of pressurized gas into the mold after the step of injecting the first amount of plastic into the cavity wherein the gas charge is of pressure and quantity sufficient to enter but not exit the first amount of molten plastic resin in the cavity and sufficient to prevent the flow of the first amount of molten plastic resin in the cavity from stopping. Simultaneously with the step of injecting the charge of pressurized gas, a second amount of molten plastic resin continues to be injected into the cavity which, together with the first amount of molten plastic resin, provides the total amount sufficient for the preparation of the plastic article. The method further includes the step of continuing to inject the charge of pressurized gas to distribute the molten plastic resin in the article-defining cavity after completion of the step of injecting the second amount of molten plastic. The method prevents imperfections on an exterior surface of the plastic article. Finally, the method includes the steps of maintaining the gas charge under pressure until the article has set up in the cavity, relieving the gas pressure within the article, and removing the article from the mold.

Preferably, the ratio of the first amount of molten plastic resin to the total amount of molten plastic resin is in the range of 0.2 to 0.7 and further, preferably, is approximately 0.5.

Further objects and features of the present invention will be made known in the following description of the best mode for carrying out the invention when considered together with the drawing figures.

BEST MODE FOR CARRYING OUT THE INVENTION

Figure 1:
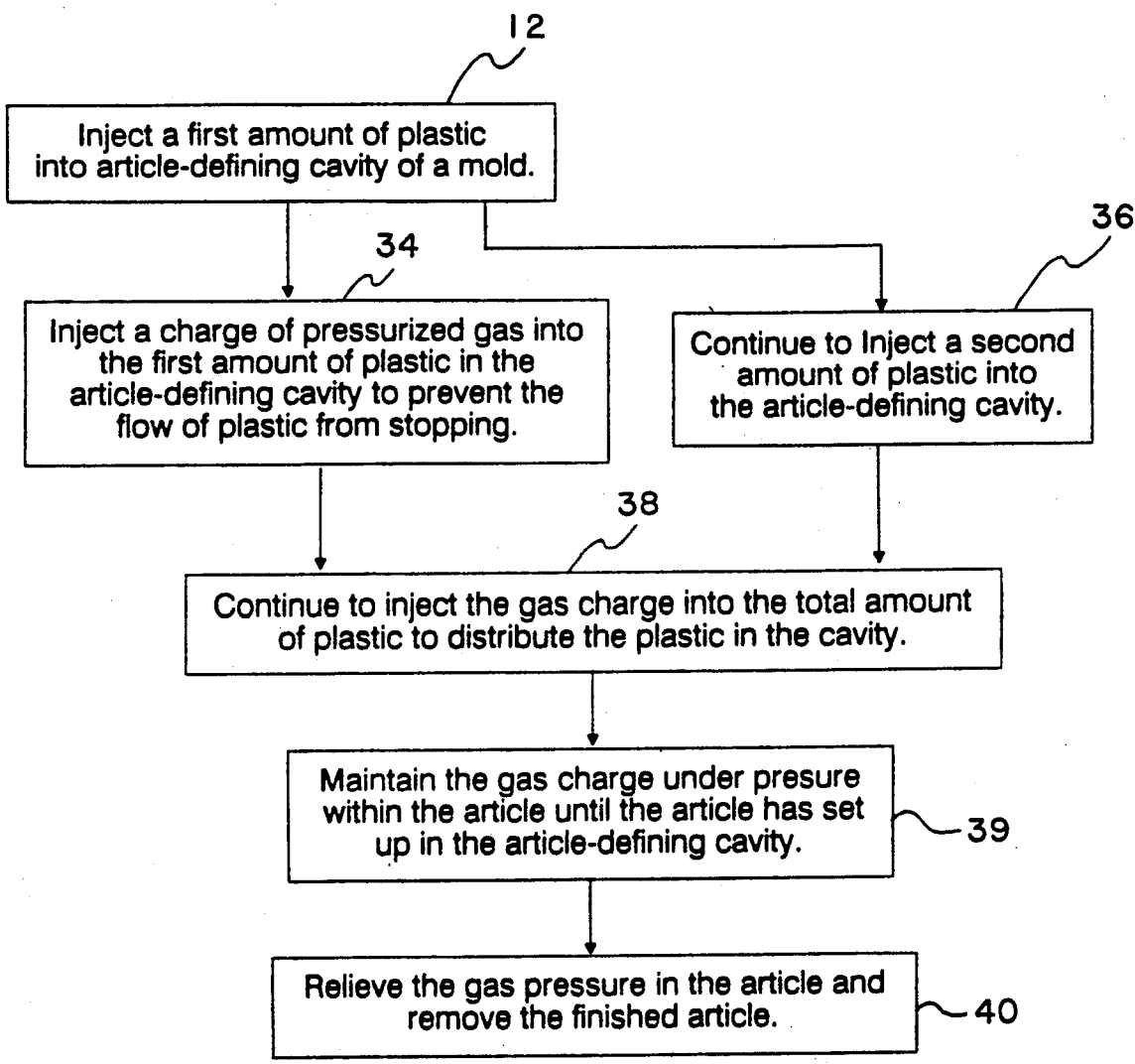
FIG. 1 is process flow chart showing the operative steps of the novel molding process of the present invention.
Figure 2:
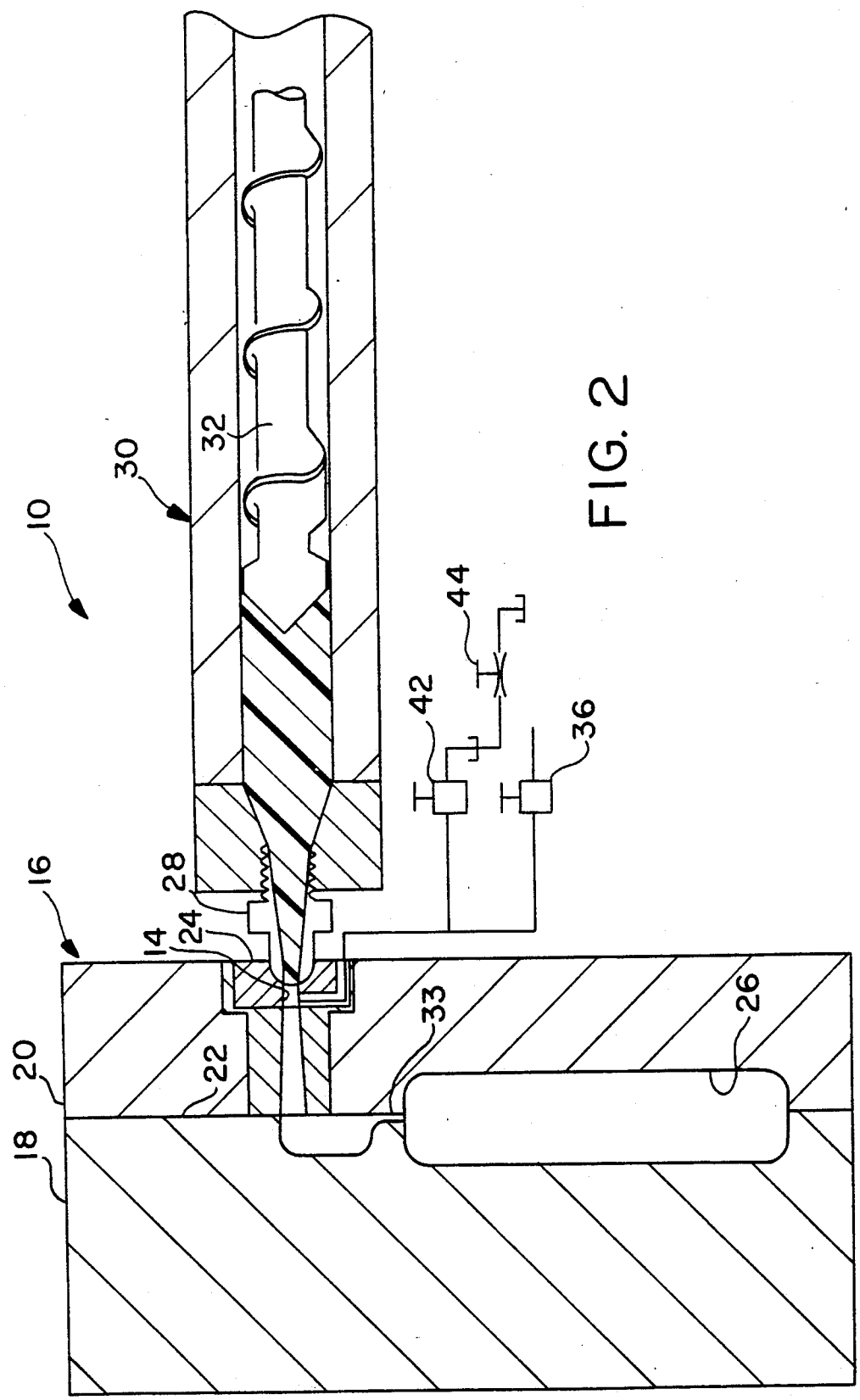
FIG. 2 is a schematic view, partially broken away and in cross-section, of a plastic injection molding system including a mold wherein plastic is accumulated in an injection molding nozzle of the system.

FIG. 1 discloses the general sequence of steps involved in carrying out the method of the present invention. FIGS. 2 through 5 are schematic illustrations of an injection molding system, generally indicated at 10, for making plastic parts or articles having relatively large or thick crosssections wherein substantial volumes of plastic are removed from the article and the injection pressures are relatively low, such as when forming automotive handles.

The following description of the invention will correlate the method steps of FIG. 1 with the corresponding structure of FIGS. 2-5 to facilitate the disclosure. As a prefatory note, the general principles of gas-assisted injection molding are disclosed in the basic patent to Friederich U.S. Pat. No. 4,101,617, issued July 18, 1978. The present invention is an improvement based on the Friederich disclosure which addressed the basic problems of coordinating the introduction of molten plastic and pressurized gas into the mold and, thereafter, venting the interior of the whole molded article on a predictable, repeatable basis to produce articles with superior surface quality on a commercial basis.

With reference to FIG. 1, in step 12, a charge or first amount of molten plastic resin is injected into an injection aperture 14 of a mold, generally indicated at 16, of the system 10. The mold 16 typically includes mold halves 18 and 20 which are separable along a mold line 22.

In a preferred embodiment of the present invention, the injection aperture 14 is defined by a device 24 for assisting in the introduction of pressurized gas into an article-defining cavity 26 of the mold 16. Such a device is described in detail in U.S. Pat. No. 4,943,407 to Hendry, assigned to the assignee of the present application. As described in this patent, the device 24 may be positioned anywhere in the system 10 before the article-defining cavity 26 (i.e. typically in the mold runner system, but may also be located on the nozzle of the system 10).

The first charge or amount of plastic resin is injected at a pressure sufficient to partially fill the article-defining cavity 26. This amount may be in the range of 20%-70% of the total amount of plastic required to make the plastic article depending on the type of plastic, the cross section of the article and the gas pressure. Preferably, the first amount of molten resin injected into the cavity 26 is approximately 50% of the total amount of molten plastic resin sufficient for the preparation of the plastic article.

The temperature of the plastic charge is within the range of processing temperatures for the resin composition to ensure sufficient fluidity of the plastic charge. However, the plastic injection temperature cannot be so great as to cause shearing or burning of the resin composition and, consequently, degradation of the material, including dehomogenization due to separation of filler materials.

As illustrated in drawing FIGS. 2 through 5 and, as illustrated in the above-noted Hendry U.S. patent, the device 24 is adapted to seat in a sprue opening of the mold 16 and is adapted to receive the tip end 28 of a nozzle of an injection molding machine, generally indicated at 30. The injection molding machine 30 also includes an injection screw ram 32 which operates in a conventional fashion to melt the plastic resin into its molten form and inject the resulting molten plastic resin through the nozzle of the machine 30. The nozzle of the injection molding machine 30 is not illustrated as having a nozzle shutoff valve. However, it is to be understood that such a nozzle shutoff valve is preferred in some embodiments of the present invention.

In the mold 16 the molten plastic resin flows through the device 24, the sprue, a runner of the mold 16 and a gate 33 which collectively define a resin flow path which extends between the injection aperture 14 and the article-defining cavity 26.

In step 34 of FIG. 1, a charge of pressurized gas is injected into the mold 16 after opening a valve 36 which is in communication with a source (not shown) of pressurized gas such as nitrogen gas. Preferably, the injection of gas is performed by the system disclosed in the above-noted application referenced by U.S. Ser. No. 552,909 filed July 16, 1990.

The opening of the valve 36 is preferably synchronized with the ram 32 Which moves at a substantially constant velocity during its stroke. The valve 36 may be controlled to open under control of a limit switch operatively coupled to be actuated when the position of the ram 32 corresponds to the first amount of plastic being located in the cavity 26.

Figure 3:
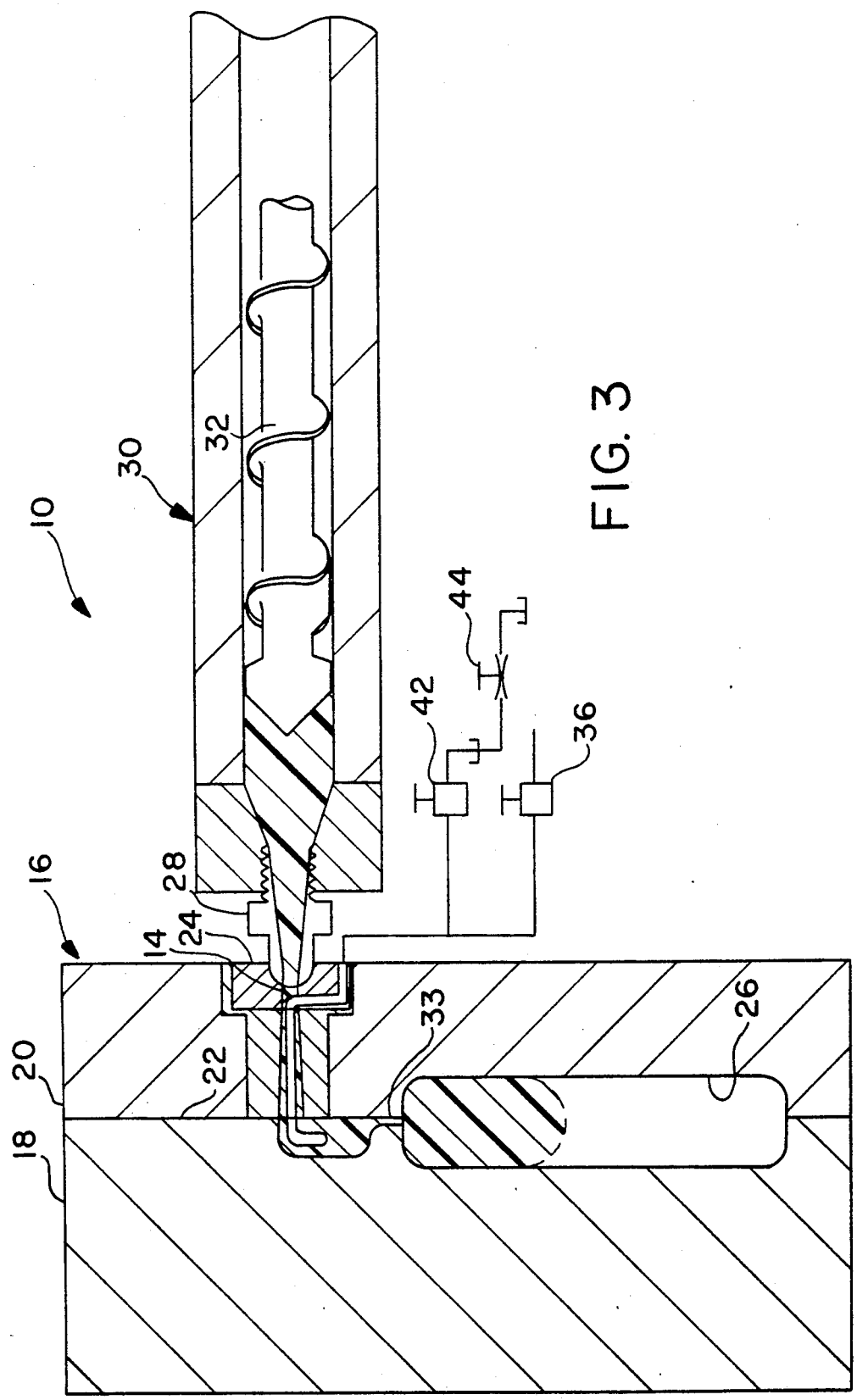
FIG. 3 is a schematic view of the injection molding system of FIG. 2 wherein approximately 50% of the amount of molten plastic resin required to form the plastic article has been injected into an article-defining cavity of the mold and a portion of a charge of pressurized gas has entered the mold, but not the article-defining cavity.
Figure 4:
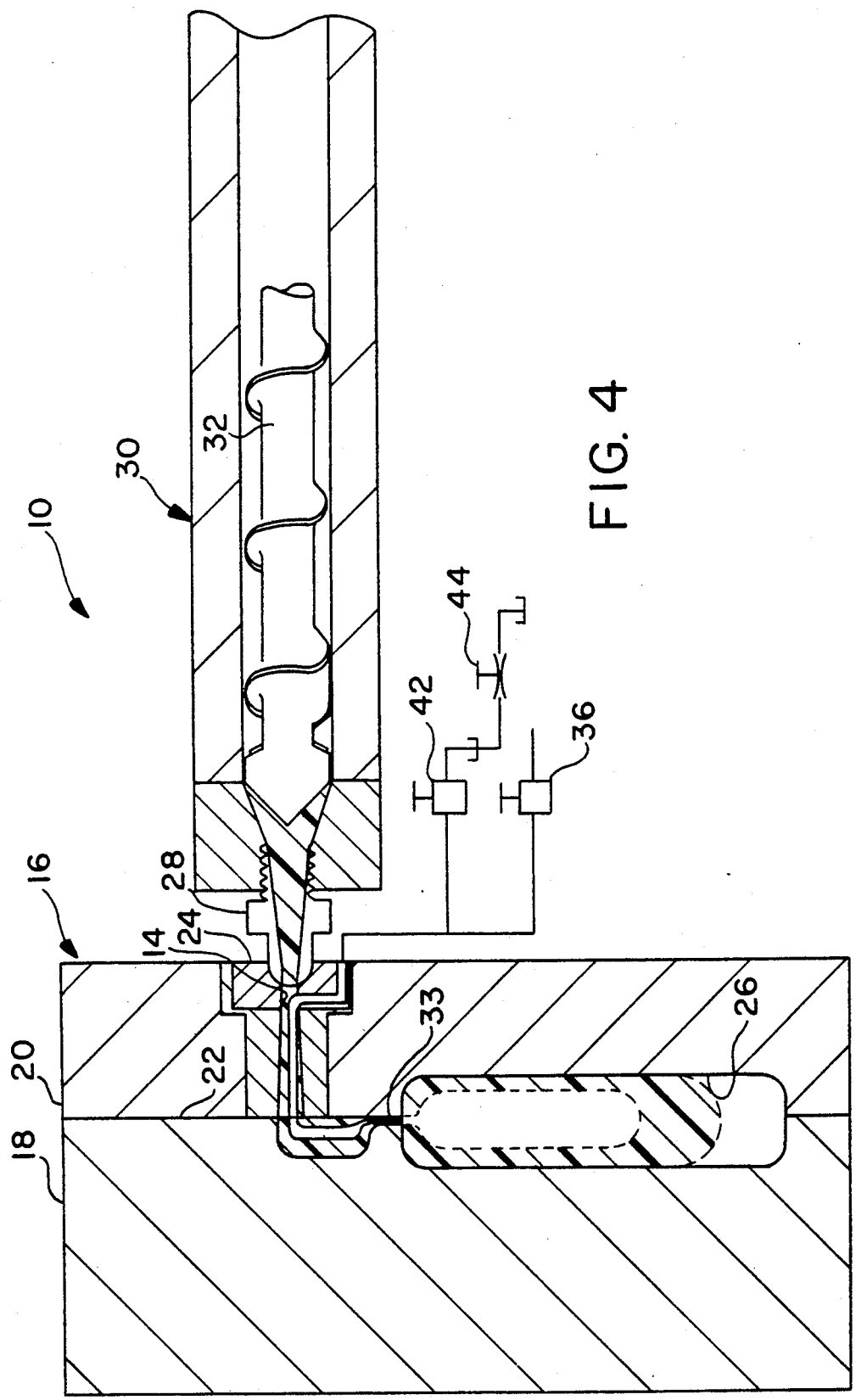
FIG. 4 is a schematic view of the injection molding system of FIG. 2 wherein the total amount of molten resin sufficient for the preparation of the plastic article is in the articledefining cavity along with a portion of the charge of pressurized gas.

As illustrated in FIG. 3, the nitrogen gas is of a pressure and quantity sufficient to enter the resin flow path and, as further illustrated in FIG. 4, to enter, but not exit, the first amount of molten plastic resin in the article-defining cavity 26. The pressurized gas prevents the flow of the first amount of molten plastic resin from stopping in the cavity 26. Alternately, the nitrogen gas is directly injected into the first amount of plastic resin in the cavity 26 by a pin (not shown) which extends into the cavity 26 and would be covered by the first amount of molten plastic resin when the pressurized gas is initially injected.

As illustrated at step 36 of FIG. 1, at the same time as (i.e. simultaneously with) step 34, a second amount of molten plastic resin is injected into the mold cavity 26. It is to be understood that since the ram 32 moves with a substantially constant velocity, the second amount flows continuously folloWing the first amount of plastic resin.

The first and second amounts of molten plastic resin together define a total amount of molten plastic resin sufficient for the preparation of the plastic article. All of the plastic required for the formation of the plastic article is located in the article-defining cavity 26 along with as portion of the charge of pressurized gas as illustrated in FIG. 4.

Figure 5:
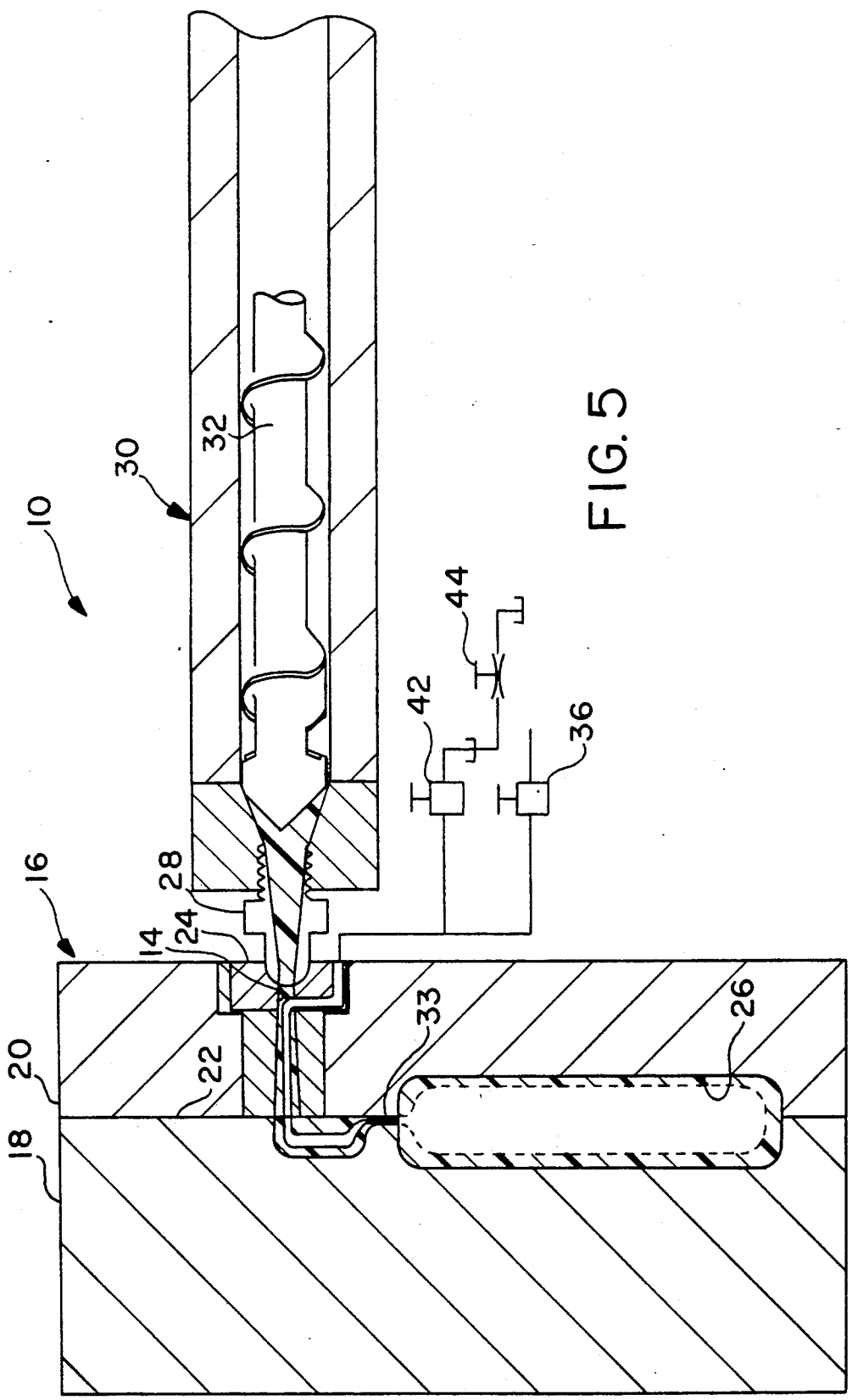
FIG. 5 is a schematic view of the injection molding system of FIG. 2 illustrating a hollow plastic article within the mold cavity wherein the total charge of pressurized gas has distributed the total amount of molten plastic resin in the article-defining cavity.

As illustrated in FIG. 5 and step 38 of FIG. 1, the charge of pressurized gas continues to be injected into the article-defining cavity 26 to distribute the total amount of molten plastic resin in the article-defining cavity 26. This final distribution of molten plastic resin in the articledefining cavity 26 occurs after the completion of step 36 of injecting the second amount of molten plastic material.

The simultaneous injection of the second amount of molten plastic resin, together with the injection of the charge of pressurized gas prevents the flow of plastic resin in the mold cavity from stopping and, consequently, allows the formation of an exterior surface of the plastic article to be free of imperfections to meet automotive company standards on Class A surface finish. The substantial first amount of plastic in the cavity 26 prior to step 34 prevents blowout (i.e. the gas makes its way outside the plastic to the surfaces of the mold defining the cavity 26).

In step 39 of FIG. 1, the pressurized gas is maintained in the article Within the article-defining cavity 26 while the plastic solidifies. The presence of the pressurized gas within the article during solidification urges the plastic into intimate contact with the walls of the article-defining cavity to further promote surface quality. The gas pressure counters the normal tendency of the plastic to shrink while cooling and leave blemishes in the surface of the finished article.

In step 40 of FIG. 1, the gas pressure within the article is relieved and the finished article is removed from the mold 16. Preferably, the gas is vented upon opening valve 42 to allow the gas to vent through the same passageway in the device 24 through which the gas entered the mold. Venting can be performed slowly in a controlled fashion by the provision of needle valve 44 in series with the valve 42.

The depressurization of the article can be performed in many different ways, such as by nozzle retraction, piercing, shearing, or like mechanical operation applied to the sprue or the runner and the like.

Upon depressurization or relieving the article, the molding including the finished article is removed from the mold 16. The appendaqes of the runner and the sprue may be separated from the finished article in accordance with conventional operations.

The advantages of the method as described above are numerous. For example, the method of the present invention keeps the molten plastic resin moving within the article-defining cavity 26 after the injection of plastic starts. This is done by starting gas flow before all of the molten plastic accumulated in the machine 30 is injected by the screw ram 32 into the mold 16. This eliminates hesitation or shadow marks which may form on the exterior surface of the article. Such marks indicate where the plastic flow stops and then starts again. As previously noted, such marked parts are not acceptable commercial products since they do not have a Class A finish.

Also, as previously noted, the present invention works particularly well with large, thick cross-sectional moldings wherein substantial volumes of plastic are removed from the article and replaced by hollow portions and wherein injection pressures are relatively low (i.e. 1000 psi-5000 psi).

The invention has been described in an illustrative manner, and, it is to be understood that, the terminology which has been used is intended to be in the nature of words of description, rather than of limitation.

Obviously, many modifications and variations of the present invention are possible in light of the above teachings. It is, therefore, to be understood that, within the scope of the appended claims, the invention may be practiced otherwise than as specifically described.

What is claimed is:

1. A method for the use of gas-assistance in molding a hollow plastic article for improving surface quality of the plastic article in an injection molding system including a mold having an article-defining cavity, the method comprising the steps of:

injecting a first amount of molten plastic resin less than a total amount of molten plastic resin sufficient for the preparation of the plastic article into the cavity, so that the first amount of molten plastic resin flows in the cavity;

injecting a charge of pressurized gas into the mold after the step of injecting the first amount of plastic into the cavity, said gas charge being of pressure and quantity sufficient to enter but not exit the first amount of molten plastic resin in the cavity and sufficient to prevent the flow of first amount of molten plastic resin in the cavity from stopping;

continuing to inject a second amount of molten plastic resin into the cavity simultaneously with the step of injecting the charge of pressurized gas, the first and second amounts of molten plastic resin providing the total amount sufficient for the preparation of the plastic article;

continuing to inject the charge of pressurized gas into the mold to distribute the total amount of molten plastic resin in the cavity after completion of the step of injecting the second amount of molten plastic resin whereby imperfections on an exterior surface of the plastic article are prevented;

maintaining the gas charge under pressure within the article until the article has set up in the cavity to form the article;

relieving the gas pressure within the article; and removing the article form the mold wherein a ratio of the first amount of molten plastic resin to the total amount of molten plastic resin is in a range of 0.2 to 0.7; and wherein the pressurized gas has a pressure between approximately 1000 psi and 5000 psi.

2. The method as claimed in claim 1 wherein the ratio is approximately 0.5.

3. The method as claimed in claim 1 wherein the mold includes an injection aperture and wherein the first amount of molten plastic resin flows through the injection aperture, along a resin flow path extending from the injection aperture to a gate adjacent the cavity, through the gate and into the cavity.

4. The method as claimed in claim 1 wherein the step of relieving the gas pressure takes place at a controlled rate.

5. The method as claimed in claim 1 wherein the step of relieving the gas pressure is accomplished through a fluid passage extending through a device which at least partially defines a resin flow path in the mold.

6. The method as claimed in claim 3 wherein the second amount of molten plastic is injected through the injection aperture along the resin flow path.

* * * * *